United States Patent [19]
Melber et al.

[11] Patent Number: 5,595,483
[45] Date of Patent: Jan. 21, 1997

[54] METHOD AND APPARATUS FOR THERMAL TREATMENT OF MATERIALS CONTAINING VAPORIZABLE SUBSTANCES

[75] Inventors: Albrecht Melber, Darmstadt; Erwin Wanetzky, Grosskrotzenburg; Dieter Uschkoreit, Kamen, all of Germany

[73] Assignee: Ald Vacuum Technologies GmbH, Erlensee, Germany

[21] Appl. No.: 406,625

[22] Filed: Mar. 20, 1995

[30] Foreign Application Priority Data

Mar. 18, 1994 [DE] Germany .......................... 44 09 401.9
Mar. 18, 1994 [DE] Germany .......................... 44 09 402.7

[51] Int. Cl.⁶ .................................................. F27B 5/04
[52] U.S. Cl. ............................ 432/205; 432/24; 110/247
[58] Field of Search .............................. 432/95, 96, 97, 432/99, 101, 205, 24; 110/247

[56] References Cited

U.S. PATENT DOCUMENTS 4,838,476  6/1989  Rahn ........................................ 432/152

FOREIGN PATENT DOCUMENTS

| | | |
|---|---|---|
| 505278 | 9/1992 | European Pat. Off. . |
| 632119 | 11/1995 | European Pat. Off. . |
| 714583 | 11/1931 | France . |
| 2683166 | 5/1993 | France . |
| 2456134 | 8/1976 | Germany . |
| 4112593 | 10/1992 | Germany . |
| 4327320 | 3/1994 | Germany . |
| 320874 | 10/1929 | United Kingdom . |
| 9508605 | 3/1995 | WIPO . |

*Primary Examiner*—Noah P. Kamen
*Attorney, Agent, or Firm*—Felfe & Lynch

[57] ABSTRACT

Materials containing vaporizable substances are exposed successively in at least two treatment chambers (10, 13, 14), which can be closed off with respect to each other, to a series of decreasing pressures and increasing temperatures. The vaporizable substances are exhausted separately from each treatment chamber (10, 13, 14) and at least partially condensed and collected. The solid materials are discharged from the last treatment chamber (14). The treatment chambers (10, 13, 14) can be closed off against each other, against the atmosphere, and against any other units which may be connected to them downline (17, 18) by vacuum valves (11, 12, 115, 16) and are connected to vacuum lines (10a, 13a, 14a) in which condensers (10b, 13b, 14b) and vacuum pumps (10c, 13c, 14c) are installed.

43 Claims, 3 Drawing Sheets

METHOD AND APPARATUS FOR THERMAL TREATMENT OF MATERIALS CONTAINING VAPORIZABLE SUBSTANCES

BACKGROUND OF THE INVENTION

The invention pertains to a process for the thermal treatment of materials which contain vaporizable substances, in order to form gases, vapors, condensates, and solids for the purpose of processing and/or disposal. The treatment occurs under negative pressure, without the introduction of oxygen, and under decreasing pressures and increasing temperatures.

The process in question pertains to the treatment of materials containing organic components such as hydrocarbons, including halogenated hydrocarbons, and/or inorganic components such as metals, filter dust, acids, lyes, etc. These materials include not only waste and garbage, but also valuable materials such as laminates of metal and elastomers such as old tires, steering wheels, packings of elastomeric materials, gaskets, contaminated flooring materials, etc.

The process can be used to convert the selected materials completely into harmless solids (ash) and gases. Depending on how the process is set up, it can also be used to recover at least a portion of the components as valuable substances in the form of, for example, condensed hydrocarbons and/or carbon, which can be sent on for some type of other useful purpose. Of course, it is also possible to use the condensates and/or the carbon as fuels within the scope of the overall disposal plan.

DE 41 12 593 discloses exposing waste materials with organic components to a single-stage pyrolysis process in the presence of oxygen. This leads to the recovery of metals, vitrified building materials, and energy. It is not possible, however, to recover fractionated distillates. On the contrary, all of the pyrolysis products obtained in the form of gases and vapors are sent to a high-temperature gasification stage and incinerated in their entirety. With the exception of metals, no valuable materials are recovered.

DE 44 18 562 discloses a single-stage thermal process in which valuable materials in the form of combustible gases and distillates and embrittled conversion products are recovered. The process is operated exclusively in a discontinuous manner; in the single treatment chamber, the pressure is reduced and the temperature raised in a temporal sequence. As a result, a mixture of distillates which can then be separated into its individual components is obtained, although this involves a complicated process of fractional distillation. The use of the treatment chamber is not efficient, because the selected substances initially occupy a large volume and gradually lose volume only during the course of the thermal process.

SUMMARY OF THE INVENTION

The invention provides a continuous process in which distillates of the individual components or groups of components are obtained, at least in an intermediate stage. The system can be filled to a high degree, the thermal treatment ultimately producing a harmless solid material, which can be sent on either as a raw material for other products or as a fuel for further process stages.

The selected materials are exposed successively to a sequence of decreasing pressures and increasing temperatures in at least two treatment chambers, which can be isolated from one another. The vaporizable substances are exhausted separately from each treatment chamber and at least partially condensed and collected. The solid materials are discharged from the last treatment stage.

Because the materials are treated under vacuum over the course of several process stages, a considerable reduction in the bulk volume and/or in the density of the accumulating materials is achieved; the components which are already volatile are always exhausted first in each successive chamber, which means that the volume of the gaseous components decreases. As a result, the treated materials, after they have emerged from the last treatment chamber, are at least almost if not completely free of volatile components.

The uncondensed vapors are preferably sent to a high-temperature incineration stage at a temperature of at least 800° C., preferably at least 1,000° C.

The incineration can be conducted in an incinerator downstream of the last treatment chamber, or in a high-temperature zone in the waste gas stack. In this way, the discharge of harmful vapors or gases into the environment is effectively prevented.

The solid materials, which consist preferably of a coke-like mass, can be discharged either to some form of recycling, e.g., to use them as a filler for other materials, or incinerated at a temperature of at least 880° C., and preferably at least 1,000° C.

The waste gases originating from the high-temperature incineration of the solids can be sent to a secondary incinerator in the waste gas stack. In this way, it is ensured that the waste gases from the high-temperature incinerator contain no harmful components.

High-temperature incineration is carried out with the addition of oxygen, and preferably under the addition of combustion air.

To keep process control as simple as possible, the materials are transported from one treatment chamber to the other by gravity. As a result, the partially treated materials are subjected not only to loosening and restratification, but also comminution, as a result of which the volatile components are expelled more effectively in the next treatment chamber.

All the substances which have passed through the high-temperature incinerator are free of unoxidized components; in particular, they are free of elementary metals, metal dusts, and similar inorganic components. They are also completely free of organic components. The waste gases may be sent through a waste gas purification process to bind, for example, chlorine, fluorine, and/or compounds thereof.

In conjunction with another embodiment, the materials are collected temporarily in at least one collection device as a way of prolonging the residence time in at least one of the treatment chambers. This collection device can be one or more star wheels or a suspended, pivoting trough.

The use of these collection devices not only promotes comminution of the materials but also their mixing during the treatment, so that new surfaces of the materials are continuously exposed to the effect of the vacuum. The heat transfer is also improved.

The following process variants are accompanied by especially advantageous results:

| Two-Chamber Process Pressure, mbar | | Temperature, ° C. |
|---|---|---|
| 1st chamber | 900–200 | 60–350 |
| 2nd chamber | 400–10$^{-2}$ | 300–600 |

In the first treatment chamber, primarily liquids such as water, acids, and lyes are evaporated out at high pressure; in the last treatment chamber at the lower pressure, mercury and other heavy metals are vaporized. That is, substances having distinctly different boiling temperatures are fractionated.

Preferred applications are solids contaminated with heavy metals and trash disposal.

| Three-Chamber Process Pressure, mbar Temperature, °C. | | |
| --- | --- | --- |
| 1st chamber | 900–200 | 60–300 |
| 2nd chamber | 500–10 | 250–350 |
| 3rd chamber | 20–10$^{-2}$ | 300–600 |

As a result of the stepwise decrease in pressure, the gases and vapors released are distributed over the individual chambers. This is preferably accompanied by a corresponding increase in temperature. Heating can be accomplished by means of gas burners or electric heating elements. In the middle chamber, preferably rubber, plastics, resins, mineral oils, coal-derived hydrocarbons, fats, packaging materials, plastic articles, fibrous materials, and textiles are vaporized and coked.

The advantages are, in particular:

the required treatment volume is distributed over at least two treatment chambers, so that the need for a single, large treatment chamber of equivalent size is eliminated;

the condensates are obtained in a form cleanly separated from one another; and there is no need to periodically heat and cool large masses, as would be required in the case of a single large treatment chamber. When the materials are transported from one treatment chamber to the next, it is necessary only briefly to equalize the pressures, preferably in the direction toward the next-higher treatment chamber, before opening the intermediate vacuum valve.

The invention also pertains to apparatus for implementing the process according to the invention.

At least two treatment chambers, which are closed off by vacuum valves against each other, against the atmosphere, and against downstream units, are connected to vacuum lines in which condensers are installed.

It is especially advantageous for the treatment chambers to be installed one above the other and to be connected by drop shafts, in which the vacuum valves are installed. In this way, the overall system occupies comparatively little space and is very compact The free fall of the materials through the drop shafts promotes mixing, comminution, and compaction which improves the degree to which the individual treatment chambers can be filled.

Preferably at least one collection device for the temporary storage and subsequent discharge of the materials is provided in at least one of the treatment chambers. This permits controlling the residence time of the materials in the treatment chamber in question with almost complete freedom, making it possible to free the materials of practically all of the vaporizable substances which can be vaporized at the given pressure and at the temperature corresponding to their vapor pressure.

The collection device can be designed as a star wheel or a trough; preferably several star wheels or troughs are provided in a downward sequence. As a result of the action of the collection device and the stepwise advance of the materials through the system, the material is comminuted; its bulk density is increased; and the heat and mass transfer are enhanced. Through the sum of these effects, the degassing effect is improved. In addition, collection devices of this type ensure that mechanical stress on the floors of the individual treatment chambers is suppressed.

The collection devices according to the invention circulate, restratify, temporarily loosen, and finally recompact the material to be treated in the treatment chambers in a simple way, without leading to mechanical wear on the chamber walls or chamber floors. In particular, through the action of the last collection device in question, it is possible to discharge the material from the treatment chamber without causing a significant amount of wear.

DETAILED DESCRIPTION OF THE PREFERRED EMBODIMENTS

Figure 1:
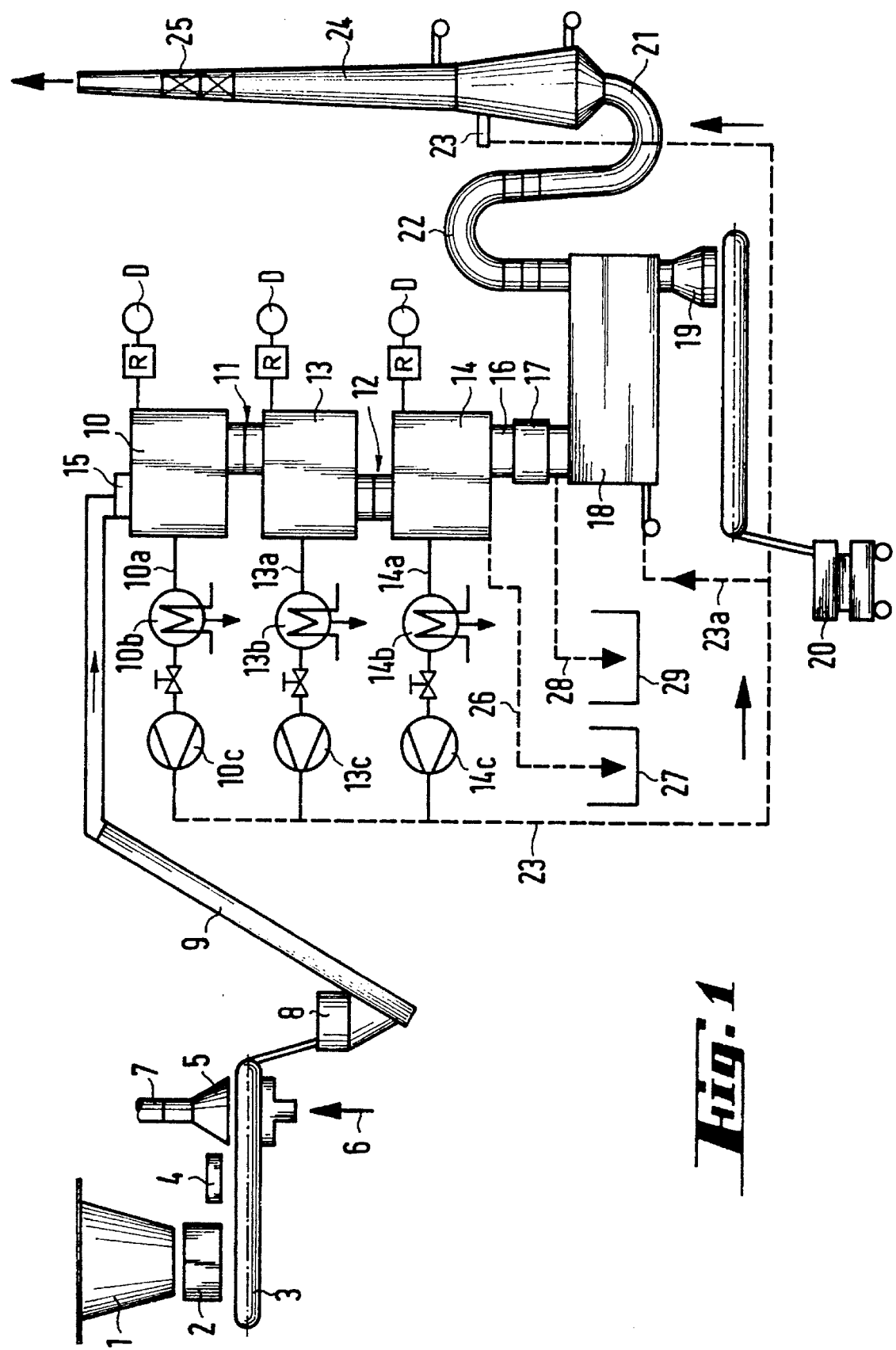
FIG. 1 shows a schematic diagram of a treatment system according to the invention with downstream devices for the high-temperature incineration of solids, waste gases, and vapors.

In FIG. 1, the materials to be treated are dumped by a feed device 1 via a grinder 2 onto a conveyor belt 3. Any loose metal components are sorted out by metal separator 4. Conveyor belt 3 takes the ground-up materials to a preliminary drying unit 5, which can be operated in the direction of arrow 6 with hot air from below. The moisture-laden drying air is exhausted through a vacuum line 7. Then the materials are ground up again in another grinding machine 8 and dumped onto a conveyor system 9, which consists of an inclined conveyor and a horizontal conveyor.

By means of conveyor system 9, the materials are introduced into a first treatment chamber 10, to which two treatment chambers 13, 14 are connected underneath. Between treatment chambers 10 and 13 there is a vacuum valve 11; and between treatment chambers 13, and 14 there is another vacuum valve 12. Each vacuum valve 11, 12 is installed in a drop shaft (not shown in detail), which connects the individual treatment chambers to each other. At the entrance to first treatment chamber 10, there is another vacuum valve 15, and at the outlet from last treatment chamber 14, there is a vacuum valve 16, so that the three treatment chambers can be closed off against each other, against the atmosphere, and against the units connected downstream, to ensure the required pressure graduations. Vacuum lines 10a, 13a, 14a, which lead via condensers 10b, 13b, 14b to vacuum pumps 10c, 13c, 14c, are connected to the individual treatment chambers 10, 13, 14. The individual treatment chambers 10, 13, 14 are provided with heaters, not shown in detail in FIG. 1; the required treatment temperatures can be adjusted by means of controllers R. The temperatures, which are kept at constant values, are displayed on read-out devices D. By means of an associated central processor (not shown), the temperature and pressure values listed in the table given above entitled "Three- Chamber Process" are set in the individual treatment chambers.

The exhausted vapors are condensed in condensers 10*b*, 13*b*, 14*b*, and the fraction which has been condensed is discharged from the condensers as shown by the arrows and sent either to a recycling process or to an incineration process, possibly even within the system shown in FIG. 1.

In last treatment chamber 14, the original organic components of the materials are usually present in the form of coke, which is discharged through vacuum valve 16 and sent to another grinding machine 17. After passing through grinding machine 17, the coke arrives at a high-temperature incinerator 18, in which incineration takes place at temperatures of at least 800° C., preferably of at least 1,000° C., with the introduction of oxygen or air at normal pressure. The solid incineration residues are discharged from high-temperature incinerator 18 through discharge device 19, loaded into a container 20, and shipped away.

The waste gases which form in high-temperature incinerator 18 are sent to a waste gas stack 21. They pass first through a cooling stage 22, in which it is possible to recover some of the heat.

The uncondensed components drawn off by way of vacuum pumps 10*c*, 13*c*, 14*c* are sent to a manifold 23, the left side of which is merely indicated in broken line. These gaseous components are also fed via the manifold into waste gas stack 21. In a high-temperature combustion zone 24 of waste gas stack 21, these waste gases are also completely reacted with oxygen and burned under the introduction of oxygen or air. It is also possible as an alternative to send the uncondensed gases or vapors through a branch line 23*a* to high-temperature incinerator 18, in which they are also almost completely incinerated. Any unburned components are then sent back via cooling stage 22 to waste gas stack 21, in which they also must pass through high-temperature combustion zone 24. A heat exchanger 25 is also installed in waste gas stack 21; this heat exchanger 25 can be used to heat the drying air which is used to dry the materials in preliminary drying device 5.

The residual solid materials discharged from last treatment chamber 14 need not be sent to high-temperature incinerator 18. In the case of residual materials consisting of metal, such as those present in auto tires, steering wheels, or gaskets, the metal residues, some of which can be very bulky, can be sent via a transport route 26 to a metal collecting container 27. From here it can be recycled, for example in a steel mill. The coked organic material downstream from grinding machine 17 can be sent through a line 28 to a collecting container 29. From here it can be recycled as fuel.

To minimize the amount of air which is introduced along with the materials into the system, vacuum valve 15 can be designed as an air lock with an intermediate vacuum line. But it is also possible to draw off a large percentage of the entrained ambient air from treatment chamber 10 itself, where the lowest possible temperatures are maintained to prevent a combustion process.

Figure 2:
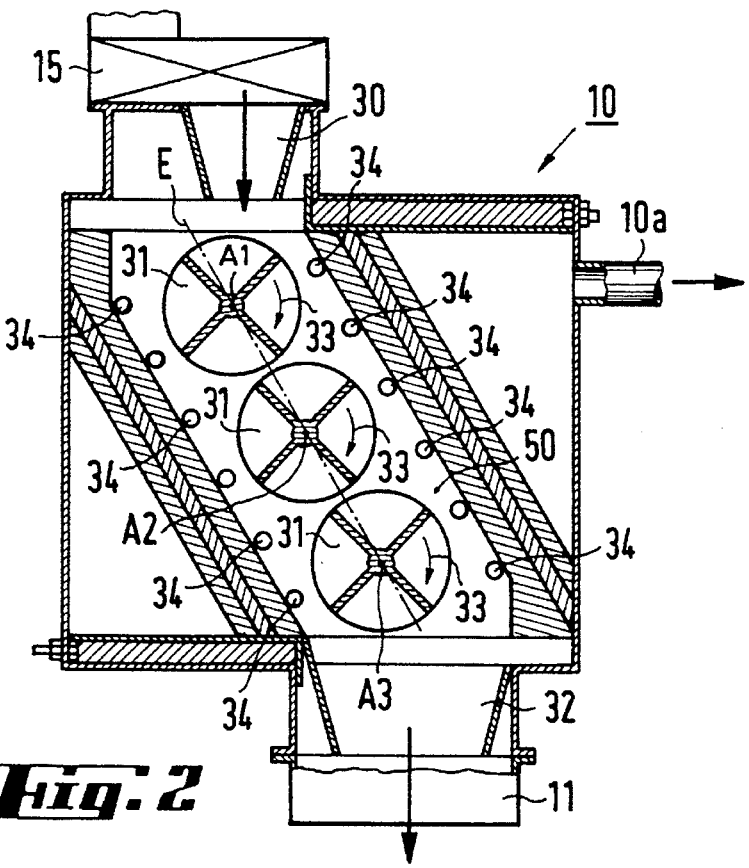
FIG. 2 shows a vertical cross section through a first exemplary embodiment of a treatment chamber according to FIG. 1.

FIG. 2 shows a vertical cross section through an exemplary treatment chamber 10. In this chamber there are several rotating collection containers 31, their horizontal axes of rotation being designated by the symbols A1, A2, A3. A first collection device 31 is installed immediately below feed opening 30 in the direction in which the materials fall. A second collection device 31 is installed under first collection device 31 in the direction in which the materials fall, so that the materials, as they are rotated around axis A1, fall into second collection device 31. In the falling direction underneath, there is a third collection device 31; the materials dumped out of this collection device 31 fall directly into a discharge opening 32.

In the case of FIG. 2, each collection device is formed by a star wheel, each with four compartments. The end surfaces of the wheels are formed either by circular disks (as drawn) or by the walls of treatment chamber 10.

Collection devices 31 are coupled to a rotary drive (not shown). Horizontal axes of rotation A1, A2, A3 are situated on a plane E, which extends at an acute angle to the vertical. Each of the axes of rotation A1 A2 A3 is offset transversely by the radius of a collection device 31. The offset is calculated in each case with respect to the dumping direction of the collection device 31 situated overhead in such a way that, when the materials are dumped, they land in the opening of the collection device underneath The individual collection devices all rotate in the same direction, as indicated by arrows 33. If properly synchronized, the successive star wheels can also be driven in opposite directions.

Treatment chamber 10 is provided with electrical heating elements 34; so-called gas jet tubes, which release no gases into treatment chamber 10, can also be used. By means of thermal insulation (not shown in detail), the development of heat is limited to interior space 50 of treatment chamber 10. By means of vacuum valves 15, 11, treatment chamber 10 can be closed off in a gas-tight manner. Thus it becomes possible to carry out a thermal treatment under the exclusion of air in each of the treatment chambers, so that by the time the materials leave treatment chamber 14, they have been coked or embrittled.

By means of a system according to FIG. 2, it is also possible to transfer liquid or viscous materials from one collection device 31 to the next one in line.

The residence time of the materials in the treatment chambers can therefore be established easily; as the materials are dumped from one collection device to another, they are mixed, restratified, and loosened, so that a thorough thermal treatment up to and including the point of coking is possible.

Figure 3:
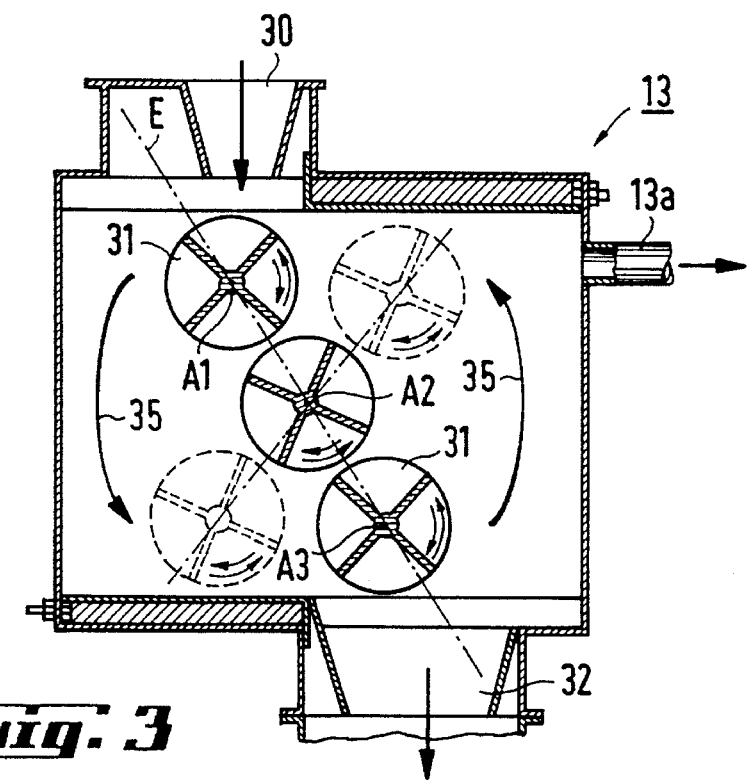
FIG. 3 shows a vertical cross section through a second exemplary embodiment of a treatment chamber according to FIG. 1.

In FIG. 3 the heaters 34 and the associated thermal insulation in chamber 13 have been omitted. In this case plane E with axes of rotation A1, A2, A3 of the star wheels can be rotated in such a way around a central axis that the lowermost star wheel in each case, with its content of materials, can be pivoted by an additional rotary drive into the uppermost position, with the result that the material can be transported again from top to be bottom through the treatment chamber in question. In the present case, the spatial position of plane E in FIG. 3 is the same as that in FIG. 2. In addition, the central axis around which the entire assembly can be rotated is the same as axis of rotation A2 of the central star wheel. From this starting position, the entire assembly of star wheels can be now be rotated or pivoted in the direction of arrows 35; the two outermost star wheels arrive in the position shown in broken line. Through the appropriate control of the rotary drives (not shown) and possibly by means of the reversal of the direction of rotation of the star wheels, the same dumping and collecting relationships as those shown in FIG. 2 are obtained even in the new position of the star wheels. The materials to be thermally treated can therefore be restratified as often as desired in the same treatment chamber, as a result of which the residence time can be extended until the desired condition is achieved.

Figure 4:
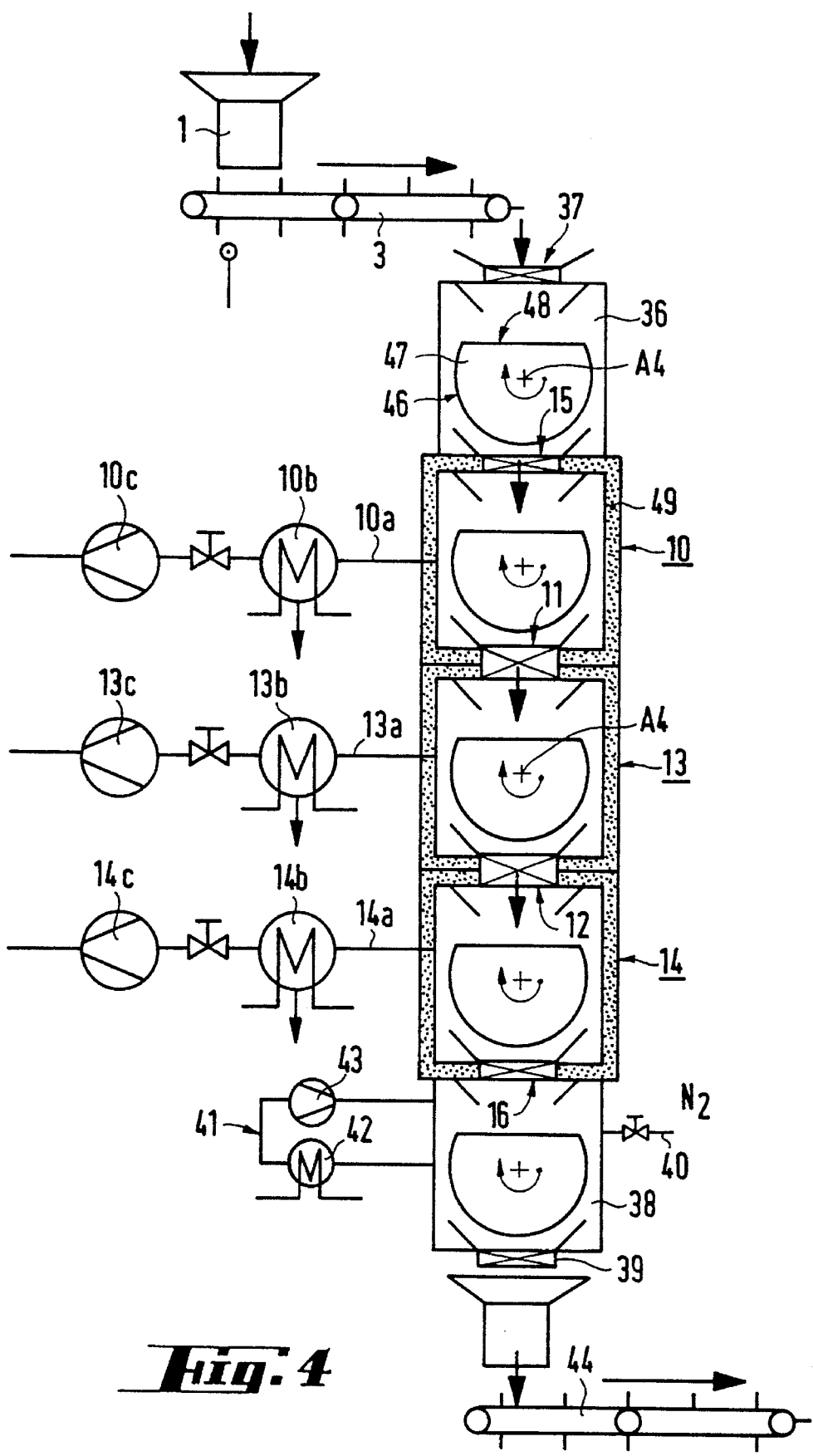
FIG. 4 shows a highly schematic vertical cross section through a system similar to that of FIG. 1, but with troughs in the individual treatment chambers instead of the star wheels shown in FIGS. 2 and 3.

In FIG. 4, the same reference symbols are used for the same parts and for parts with the same function. The following details are different from those of FIGS. 1–3:

Vacuum valve 15 at the entrance to first treatment chamber 10 is preceded by a special lock chamber 36 with an additional vacuum valve 37. This lock chamber 36 can be connected to a vacuum pump to free the materials of at least some of the air trapped in them. A cooling chamber 38 is connected to last treatment chamber 14 via vacuum valve 16, so that nitrogen can be introduced through a line 40 to cool the heated materials in an inert atmosphere at elevated pressure. To cool the nitrogen atmosphere, a cooling water circuit 41 is provided, to which a heat exchanger 42 and a circulation pump 43 belong. From cooling chamber 38, the treated materials are discharged through vacuum valve 39 and sent on a conveyor belt 44 for further use and/or disposal.

In order to fill the individual chambers to a large degree and increase throughput of the system, collection devices 45 are designed as troughs with an open top. These troughs can pivot around an axis of rotation A4 situated on their plane of vertical symmetry and are connected to rotary drives (not shown). The troughs have a partially cylindrical lateral wall 46 and end walls 47 at both ends, which are designed as segments of circular disks. As a result, the troughs have openings 48, through which the materials to be treated can be loaded in and dumped out. The horizontal axes of rotation of all the troughs are installed in a vertical plane to ensure that all of the material tipped out of one of the upper collection devices will arrive in the collection device located underneath. This is necessary on account of the large cross section of openings 48 and on account of the presence of guide devices (not shown) in the area of vacuum valves 15, 11, 12, 16. In the system according to FIG. 4, all treatment chambers 10, 13, 14, lock chamber 36, and cooling chamber 38 form a vertical tower, in which treatment chambers 10 13, 14 are surrounded by a continuous layer of thermal insulation 49.

The process and apparatus make possible a great flexibility. Small amounts of material can successively pass through all of the treatment chambers. In the case of large amounts of material, these can be simultaneously treated portionwise in individual chambers and further transported from chamber to chamber. The treatment chambers may also exhibit different volumes where the first chamber exhibits the largest volume and subsequent chambers exhibit smaller volumes. In this manner, the chamber volumes can be adapted to the shrinking amounts of material.

We claim:

1. Process for separating vaporizable substances from materials, said process comprising providing at least two treatment chambers in succession, said treatment chambers comprising a first treatment chamber and a last treatment chamber, feeding said materials through successive chambers in steps, isolating said chambers from each other after each step, maintaining successive said chambers at successively lower pressures and successively higher temperatures, thereby generating vaporized substances and solids in each chamber, exhausting vaporized substances separately from each treatment chamber, and discharging solids from the last treatment chamber.

2. Process as in claim 1 comprising the additional steps of at least partially condensing the vaporized substances exhausted from each treatment chamber, thereby producing condensates and uncondensable vapors, and collecting said condensate.

3. Process according to claim 2 further comprising recycling the solids discharged from the last treatment chamber.

4. Process according to claim 2 wherein at least some of the condensates recovered from the individual treatment chambers are sent to a combustion process.

5. Process according to claim 21 further comprising incinerating the solids discharged from the last treatment chamber at a temperature of at least 880° C. thereby producing waste gases.

6. Process according to claim 5 wherein the waste gases coming from the high-temperature incineration of the solids are sent to a secondary combustion stage in a waste gas stack.

7. Process as in claim 1 comprising the additional step of incinerating said uncondensable vapors at a temperature of at least 880° C.

8. Process according to claim 1 wherein the materials are converted to a coked state by the time they leave the last treatment chamber.

9. Process according to claim 1 wherein the materials are fed through successive chambers by gravity.

10. Process according to claim 1 wherein the materials are collected temporarily in at least one collection device to prolong the residence time in at least one of the treatment chambers.

11. Process according to claim 1 wherein said at least two treatment chambers consist of first and second treatment chambers, a pressure of 900–200 mbar and a temperature of 60°–350° C. are selected for the first treatment chamber, and a pressure of 400–$10^{-2}$ mbar and a temperature of 300°–600° C. are selected for the second treatment chamber.

12. Process according to claim 1 wherein said at least two treatment chambers consist of first, second, and third treatment chambers, a pressure of 900–200 mbar and a temperature of 60°–300° C. are selected for the first treatment chamber; a pressure of 500–10 mbar and a temperature of 250°–350° C. are selected for the second treatment chamber; and a pressure of 20–$10^{-2}$ mbar and a temperature of 300°–600° C. are selected for the third treatment chamber.

13. Process according to claim 1 wherein the materials are well mixed in at least one of the treatment chambers during the treatment.

14. Process according to claim 1 wherein the materials are exposed to a comminution process before they are introduced into the first treatment chamber.

15. Process according to claim 1 wherein the materials are exposed to a drying process before they are introduced into the first treatment chamber.

16. Process according to claim 1 wherein the solid materials formed are subjected to a grinding process after they have been discharged from the last treatment chamber.

17. Apparatus for treating materials containing vaporizable substances, said apparatus comprising a plurality of treatment chambers in a vertical sequence, said treatment chambers comprising a first treatment chamber and a last treatment chamber, drop shafts connecting said treatment chambers to each other, a plurality of vacuum lines connected to respective treatment chambers, a condenser in each vacuum line, and valve means for closing said chambers against each other and against an outside atmosphere, said valve means comprising a valve in each said drop shaft.

18. System according to claim 17 further comprising an incinerator and an exhaust stack following said last treatment chamber.

19. Apparatus as in claim 17 wherein each vacuum line is connected to a vacuum pump having an outlet connected to high temperature incineration means.

20. Apparatus as in claim 17 wherein at least one of said condensers has an outlet connected to high temperature incineration means.

21. Apparatus as in claim 17 wherein at least one of said treatment chambers has at least one collection device therein for temporary holding and later discharge of materials in said at least one chamber.

22. Apparatus as in claim 21 further comprising heating means in said at least one chamber for heating of materials held by said at least one collection device.

23. System as in claim 22 wherein said at least one treatment chamber has a plurality of said collection devices arranged in series so that materials discharged by one of said devices is received by another of said devices.

24. System as in claim 21 wherein said at least one collection device is a star wheel having a horizontal axis of rotation connected to a rotary drive.

25. System as in claim 24 wherein a plurality of star wheels in at least one of said chambers have horizontal axes in a common plane which is at an acute angle to vertical.

26. Apparatus as in claim 25 wherein said common plane can be rotated 180° around a central axis connected to a rotary drive.

27. Apparatus as in claim 21 wherein said at least one collection device comprises a trough having a horizontal axis of rotation connected to a rotary drive.

28. Apparatus as in claim 27 wherein each said trough has a surface which is partially cylindrical.

29. Apparatus as in claim 27 wherein a plurality of said chambers have respective said troughs with horizontal axes of rotation in a common vertical plane.

30. Apparatus as in claim 17 wherein at least two of said treatment chambers form a vertical tower which is surrounded by continuous thermal insulation.

31. Apparatus for treating materials having vaporizable substances, said apparatus comprising a plurality of treatment chambers connected in a sequence, said chambers comprising a first treatment chamber and a last treatment chamber, valve means for closing said chambers against each other and against an outside atmosphere, vacuum pumping means for a successive reduction of pressure from said first treatment chamber to said last treatment chamber, said vacuum pumping means including a vacuum line connected to each treatment chamber, a condenser in each vacuum line, and heating means for successively increasing the temperature in said chambers from said first treatment chamber to said last treatment chamber.

32. Apparatus as in claim 31 wherein said last treatment chamber is a coking chamber where solid residues of treated material remain after heating and evacuation of said last treatment chamber, said last treatment chamber comprising outlet means for discharging said residues.

33. Apparatus as in claim 31 wherein each vacuum line is connected to a vacuum pump having an outlet connected to high temperature incineration means.

34. Apparatus as in claim 31 wherein at least one of said condensers has an outlet connected to high temperature incineration means.

35. Apparatus as in claim 31 wherein at least one of said treatment chambers has at least one collection device therein for temporary holding and later discharge of materials in said at least one chamber.

36. System as in claim 35 wherein said at least one treatment chamber has a plurality of said collection devices arranged in series so that materials discharged by one of said devices is received by another of said devices.

37. System as in claim 35 wherein said at least one collection device is a star wheel having a horizontal axis of rotation connected to a rotary drive.

38. System as in claim 37 wherein a plurality of star wheels in at least one of said chambers have horizontal axes in a common plane which is at an acute angle to vertical.

39. Apparatus as in claim 38 wherein said common plane can be rotated 180° around a central axis connected to a rotary drive.

40. Apparatus as in claim 31 wherein said at least one collection device comprises a trough having a horizontal axis of rotation connected to a rotary drive.

41. Apparatus as in claim 40 wherein each said trough has a surface which is partially cylindrical.

42. Apparatus as in claim 40 wherein a plurality of said chambers have respective said troughs with horizontal axes of rotation in a common vertical plane.

43. Apparatus as in claim 31 wherein at least two of said treatment chambers form a vertical tower which is surrounded by continuous thermal insulation.

* * * * *

UNITED STATES PATENT AND TRADEMARK OFFICE
CERTIFICATE OF CORRECTION

PATENT NO. : 5,595,483
DATED : January 21, 1997
INVENTOR(S) : Melber et al.

It is certified that error appears in the above-identified patent and that said Letters Patent is hereby corrected as shown below:

On the title page, item [73] Assignee, line 1, change "Ald" to --ALD--.

In column 2, line 23, change "880°" to --800°--.

In column 6, line 17, after "underneath" add -- . --.

In column 7, line 25, after "plane" add -- , --.

In Claim 5, column 8, line 8, change "880°" to --800°--.

In Claim 7, column 8, line 16, change "880°" to --800°--.

Signed and Sealed this

Seventeenth Day of August, 1999

Attest:

Q. TODD DICKINSON

Attesting Officer

Acting Commissioner of Patents and Trademarks